Sept. 21, 1965   G. BOUCHET   3,207,027
OPTICAL PYROMETER HAVING A CYCLICALLY MOVING DETECTOR
Filed Dec. 10, 1959   2 Sheets-Sheet 1
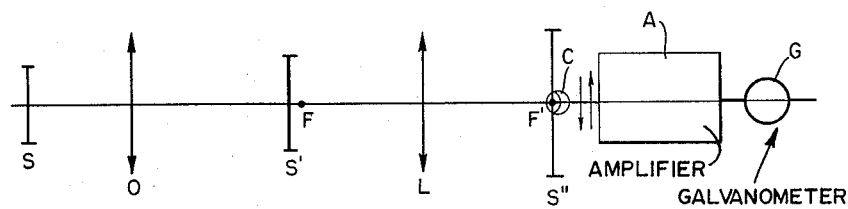
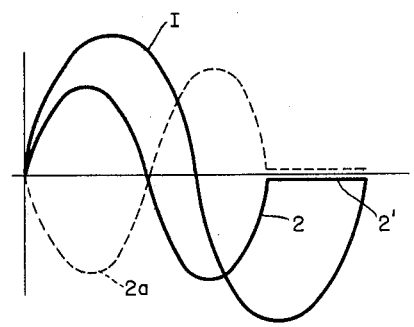
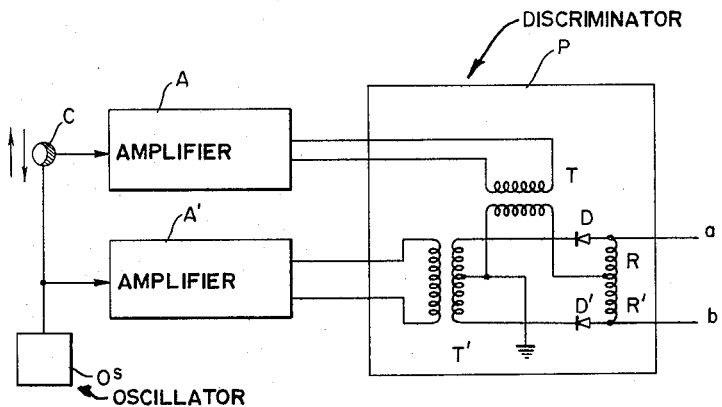
INVENTOR.
GEORGES BOUCHET
BY Bauer and Seymour
ATTORNEYS INVENTOR.
GEORGES BOUCHET
BY Bauer and Seymour
ATTORNEYS

United States Patent Office 3,207,027
Patented Sept. 21, 1965

3,207,027
OPTICAL PYROMETER HAVING A CYCLICALLY MOVING DETECTOR
Georges Bouchet, Bellevue, France, assignor to Compagnie de Saint-Gobain, Paris, France
Filed Dec. 10, 1959, Ser. No. 858,787
Claims priority, application France, Dec. 15, 1958, 781,643, Patent 1,218,514
8 Claims. (Cl. 88—22.5)

The present invention relates to a temperature-indicating device. More particularly, the invention relates to a device which is capable of very rapid temperature response and which may be employed for the regulation, indication, and/or recording of temperatures in the range from but little above ambient temperatures to very high temperatures.

Operation of the apparatus of the invention is based upon a comparison of the rays emitted by the body which it is desired to observe or control and the standardized or predetermined rays emitted by a calibrated light source such as an electric light filament. Such comparison, which is obtained by means such as a photoelectric cell, is made between an area of uniform brilliance of the surface of the body alone which is being observed or controlled and the same area or an area of the same brilliance upon which an incandescent filament is superimposed. The apparatus includes one or more photoelectric cells energized by an image of an area of the body being studied or observed and one or more calibrated filaments energized by a constant current source, such filament being placed in the plane of the image of the body.

The one or more photoelectric cells employed is driven preferably wtih a periodic motion, vibratory or circulatory, the amplitude of such motion being such that the photoelectric cells do not pass out of the luminous field and also in such manner that during such movement the light emitted by the one or more filaments alternately falls upon and does not fall upon one or more photoelectric cells. The resulting periodic currents generated by the photoelectric cells are fed into an electronic circuit which, in the simplest apparatus herein disclosed, gives an indication of the moment at which a desired temperature of the body is attained. In other disclosed embodiments of the apparatus, there is also given an indication of the direction of the difference in temperature, between the body and the filament whereby the temperature of the body may be indicated or recorded.

The invention has as one of the objects thereof the provision of a novel, simple and easily operated apparatus for indicating temperature of a body.

A further object of the invention resides in the provision of an improved novel method of determining the temperature of a body.

There are described below, simply as non-limiting examples, several particularly advantageous preferred embodiments of the apparatus. Such embodiments are particularly characterized by the rapidity of their temperature measurement, and by the accuracy with which the temperature is indicated or recorded and the temperature of the body being observed may be controlled.

In the drawings accompanying the specification and forming a part thereof:

FIG. 1 is a schematic view of a first embodiment of apparatus in accordance with the invention;

FIG. 2 is a graph illustrating the motion of the photoelectric cell of the apparatus of FIG. 1 and of the current emitted by such cell;

FIG. 3 is a schematic view of a second embodiment of apparatus in accordance with the invention, such view including a wiring diagram of a discriminator whereby the apparatus yields an indication of the direction or sense in which the temperature of the body differs from that of the filament;

Figure 4:
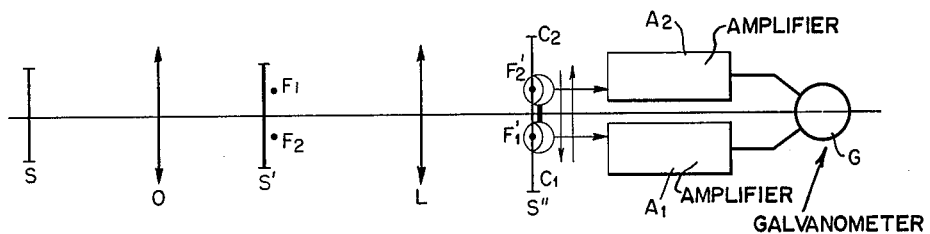
FIG. 4 is a schematic diagram of a third embodiment of temperature-indicating and/or recording apparatus in accordance with the invention.
Figure 5:
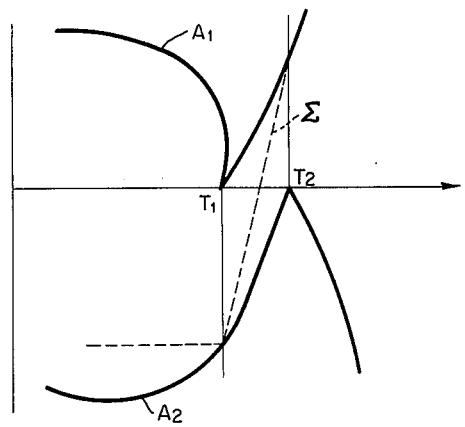
Figure 6:
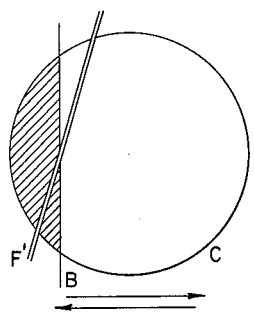

FIG. 5 is a graph indicating the relationship between the current generated by the two photoelectric cells of the device of FIG. 4 and the instantaneous resultant of such two currents; and FIG. 6 is a diagram of a further manner of disposition of the calibrated filament whereby to obtain a substantially ideal sinusoidal current response from the photoelectric cell during operation of the apparatus.

In the first embodiment of the apparatus, diagrammatically illustrated in FIG. 1, S designates the surface of a heated body, the temperature of which it is desired to indicate or record. Spaced from such body or source S, along an optical axis indicated by the elongated central horizontal line in such figure is an objective lens O. Lens O forms an image S' of the source S, as shown. There is disposed in the plane of the image S' a calibrated filament F in FIG. 1 (and also in FIG. 4) for clarity of illustration, the filament is shown displaced slightly from the plane of the image S'. In actual practice, the filament lies in the plane of the image. The portion of the filament F lying in such plane is straight; the length of such straight portion of the filament may be either a small part of, or the total length of, the filament; if desired, the full length of the filament may be straight and may be made to lie in such plane. The portion of the filament lying in the image plane is preferably at least several millimeters in length. Filament F is heated by a direct current of constant value, such value being adjustable as required. Such current source is maintained constant in a known manner so as to maintain constant the temperature of at least a portion of several millimeters of the filament lying centrally in the plane of the image S'.

Another lens L is disposed on the optical axis of the apparatus and receives the rays issuing from the image S' and from the central portion of the heated filament F. The combination of such two sets of rays forms a second image S" located in the plane of the photoelectric cell C which, as shown, is vibrating in the plane of the sensitive face of said cell and perpendicularly to the image F' of the filament. The composite image received upon cell C is the resultant of rays from the central portion of image S' and from the central portion of filament F. The latter image is indicated as a central spot F' on the cell C in FIG. 1.

The cell C may be maintained in vibration by any one of a number of known means. The frequency of vibration of cell C may be of any value. The cell C may, for example, be connected to the movable part of an electrodynamic loud speaker, the field coil of the speaker being energized by an alternating current generated by an alternator driven at a desired speed. Alternatively, cell C may be driven by a self-controlling vibrating system analogous to that employed to give a constant pitch or frequency, such system employing mechanical vibrations, as of a quartz plate, to control the frequency of an electric oscillator which maintains the system in vibration. Any system which transforms alternating current energy to a mechanical vibration or oscillation is suitable for the driving of cell C. Among such means are vibrating condensers, crystals, and ceramic piezoelectric elements, such elements being driven or worked at resonance, as by forced vibration.

When the cell C is thus vibrated, it alternately and cyclically receives a luminous flux which is emitted first by a portion of the image S' only of the object S, and then by a portion of such same surface upon which there is superimposed the image F' of the heated filament F.

Although cell C may be any one of a number of known photoelectric cells, it is preferably a photodiode having a light-receiving surface of very small area; such cell should be devoid or substantially devoid of microphonic effect, that is, it should not generate any current or have any current-modifying effect simply by reason of its being vibrated. Cell C is connected to an amplifier A of conventional structure, element A amplifying the alternating voltages fed thereto and delivering them to a galvanometer or other current-measuring means G.

It will be seen that if the temperature of the filament F is adjusted to such value that the brilliances of images S″ and F′ are identical, no current will be fed into the amplifier A. This follows from the facts that the cell C is responsive to the total flux received by it, and that the amplifier A is responsive only to variations in such flux. The apparatus above described is capable of very rapid response in cycles in which the temperature of the body is rising, as well as those in which the temperature of the body is falling. Such apparatus allows the detection of the precise moment when the temperature of the body attains a desired temperature, so that the operator may immediately intervene and perform whatever step is necessary. Such apparatus may, for example, be utilized in the case of controlling the chilling of metal pieces and the like which have been heated by high frequency or blowpipe means. As a result, heat treatments of various articles may be carried out with great precision with the aid of the apparatus of the invention.

The same apparatus, equipped with a cell or with an optical device adapted to receive long wave length infra red rays allows the measurement of the surface temperature of a variety of different bodies, even at relatively low temperatures on the order of 100° C.

An apparatus such as that above described permits the instant stopping of a rapid thermal operation. An operator provided only with an optical pyrometer would not be able to follow such rapid operation at all closely or to control the operation with any degree of precision. However, in such simple form, the apparatus does not indicate the sense or direction in which the temperature of the source or body S and of the filament F differ from each other. In embodiments of the apparatus to be described hereinafter, the apparatus yields an indication of the direction of such difference in temperature, so as to allow the indication or recording of the temperature of the body and also to permit use of the apparatus to control the temperature of the body. In the course of the description which follows, discussion will be restricted to the means used to obtain the direction of the temperature difference, the indicating, recording, and/or regulating means being conventional and being connected to the apparatus of the invention in a manner obvious to those skilled in the art. In the case of regulation of the temperature of body S, the resultant combination of apparatus will be connected to control the source of heat for the body. When the apparatus is employed for indicating and/or recording the temperature of the body, means will be included in the apparatus to permit the pre-setting of the temperature of filament F to a predetermined desired value.

In FIG. 2, there is shown diagrammatically the relationship between the speed of movement of cell C and the instantaneous intensity of the signal emitted by amplifier A. The curve I shows the instantaneous displacement of the cell C from its neutral position (the horizontal central line) as a function of time. One can then approximate the current output of amplifier A by a continuous sinusoidal wave 2 which is followed by a straight central line 2′, the total period of curve 2 and line 2′ being equal to the period of vibration of the cell C. Depending upon whether or not the source or body S is hotter or colder than the filament F, the sinusoidal wave will change phase by 180°. Thus, for example, if the solid line curve 2 and straight line 2′ indicate a condition in which the body S is hotter than the filament, the reversed, dotted line curve 2a and dotted straight line will indicate a condition in which the body S is colder than the filament. The amplitude of either of such curves 2 or 2a will vary according to the difference between the temperatures of body S and of filament F.

The direction of the difference between the temperature of the body and the temperature of the filament F may be determined in a number of ways. One such manner is illustrated by the apparatus of FIG. 3 wherein the phase of the movement of cell C is electronically correlated with the phase of the signal emitted by the cell C, the two electronic responses being combined so as to give a composite signal which is either positive or negative, depending upon the direction of the difference of the two temperatures.

In FIG. 3 there is a first electronic circuit receiving the output of the cell C, such circuit including an amplifier A which yields an alternating voltage which varies in accordance with the current output of the cell C. The cell, in this instance, is driven with a vibratory motion by an oscillator Os. A second electronic circuit is connected to the output of the oscillator and includes an amplifier A′, which is similar to amplifier A. Amplifier A′ thus receives an alternating voltage which is in phase with and has an amplitude proportional to the vibration of the cell C.

The alternating current signals delivered by amplifiers A and A′ are mixed in a phase bridge or discriminator P, device P having a transformer T receiving the signal emitted by amplifier A and a second transformer T′, the primary of which receives the signal emitted by amplifier A′. The midpoint of the secondary of the transformer T′ is connected to ground and to one lead from the secondary of transformer T. The other lead from the secondary of the transformer T is led to the junction of two serially connected resistors R and R′ which are interposed between the two output wires a and b of the unit P. Inwardly beyond resistance R, wire a is connected to one lead of the secondary of transformer T′ through the medium of a diode rectifier D. Inwardly of resistance R′, the lead b is connected to the other end of the secondary of transformer T′ through a similar, similarly disposed, diode rectifier D′. Diodes D and D′ may be, for example, conventional germanium or silicon diodes. The components of the thus described discriminator P are such that in the absence of any signal emitted by amplifier A there is no potential difference between the leads a and b. This follows from the equality of the currents flowing in the resistors R and R′.

When a signal of the same frequency is fed to transformer T from the amplifier A, however, such signal adds to one of such currents flowing is resistors R and R′ and subtracts from the other. This results in a difference of potential between leads a and b, the direction or sense of such difference depending upon the relationship between the phase of the signal emitted by amplifier A and the phase of the signal emitted by amplifier A′. The value of such difference in potential between leads a and b depends upon the difference between the temperature of the body S and of the filament F.

In certain instances the amplifier A′ may be eliminated from the system if the alternating voltage driving the cell C is derived from a source sufficiently powerful to feed the phase bridge or discriminator.

The embodiment of the apparatus illustrated in FIG. 3 is only one non-limiting example of an electronic circuit. There may be employed instead of the means there shown any other conventional apparatus which permits the comparison of the phases of the two signals, either comparing their variations by means of diodes or by employing electronic tubes. As an example of a different type of electronic circuit which may be employed, there may be pointed out the case in which the reference signal introduced into the transformer T′, is obtained by modulation of an auxiliary source of light by means of another photoelectric cell vibrating in phase with the first photoelectric cell, as by being fixedly mechanically connected thereto.

In accordance with another embodiment of the invention shown schematically in FIG. 4, the apparatus includes two identical electronic circuits which cooperate respectively with two filaments $F_1$ and $F_2$ which are appropriately spaced from each other in or substantially in the plane of the image S', such filaments being held at slightly different temperatures. Two identical photoelectric cells $C_1$ and $C_2$ are, for example, mechanically connected together for joint vibration in the plane of the second image S'. Cell $C_1$ receives on its face a composite image of a portion of the image S' and the image $F'_1$ of filament $F_1$. Cell $C_2$ receive on its face a composite image made up partly of a second image of image S' and an image $F'_2$ of filament $F_2$. The outputs of cells $C_1$ and $C_2$ are led respectively to amplifiers $A_1$ and $A_2$, the output of the amplifiers being led to a galvanometer G. It will be seen that the signals emitted by the amplifiers $A_1$ and $A_2$ cancel or substantially cancel each other when the temperature $T_1$ of filament $F_1$ is only slightly different from the temperature $T_2$ of filament $F_2$. This is shown in the graph of FIG. 5. In such graph the curve $A_1$ is a plot of voltage against time for the signal from amplifier $A_1$, and the curve $A_2$ is a plot of voltage against time for the output of amplifier $A_2$. The dotted line $\Sigma$ is the algebraic resultant of the two curves $A_1$ and $A_2$. The line $\Sigma$ changes abruptly in sign, that is it crosses the horizontal axis of the graph, between $T_1$ and $T_2$. Such change of sign of the line $\Sigma$ thus makes it readily possible to determine the direction or sense of the difference in temperature between the body S and either of the filaments $F_1$ and $F_2$. Such rapid change of sign of the line $\Sigma$ also makes it possible readily to use the apparatus of FIG. 4 for the recording of temperature or for the regulation of the temperature of the body S.

In accordance with the invention, transistors may be used instead of electronic tubes as elements of the amplifiers or the oscillators of the apparatus. Instead of photoelectric cells as the light sensitive elements, there may be employed phototransistors. In accordance with the invention, there may be employed cells which are particularly sensitive to infra red in combination with an appropriate optical element such as that, for example, obtained by adding fluorine or sodium chloride to cast silica.

In accordance with the invention, there may be given particular forms to the surface of the cell exposed to the luminous flux, and also particular forms to the filament, so as to give the cell and the filament such disposition relative to each other as to obtain a signal amplified by the amplifier A which is as sinusoidal as possible. As an example, there is shown in FIG. 6 a mask placed upon the face of the cell, such mask having a straight edge B, the portion of the face of the cell to the left of line B being maintained protected from illumination. The image of the filament is shown at F', the filament body so disposed as to make an acute angle with the edge B of the mask. The cell is vibrated horizontally with respect to the image of the filament, as shown by the arrows. It will be seen that if the movement of the cell is sinusoidal, that is, simple harmonic, the variation of the length of the filament exposed to the active face of the cell C likewise varies in a sinusoidal manner when the amplitude of vibration of the cell is small.

If it is necessary to provide a series of temperature scales, the intensity of the light rays emitted by the source S may be diminished by causing them to pass through absorbent media such as neutral gray glass. There may also be provided filters which allow only a certain band of wave lengths to pass, whereby to decrease the difficulties arising from the different coefficients of refraction of light of different wave lengths in the optical system. Such transmitted band of light may be that at which the photoelectric cell employed is particularly efficient and accurate.

The invention also includes the adjustment of the brilliance of the light source by one or more gray neutral optical wedges as an alternative to the adjustment of the brilliance of the calibrated filament with respect to the brilliance of the source or body being studied. Further, the calibrated filament may be energized by an alternating current in those cases wherein a phase bridge or discriminator is employed to compare the phase and amplitude of the signal emitted from the cell with the phase and amplitude of the mechanical motion of the cell.

The invention allows the provision of an apparatus which delivers information as to the sense and the amplitude of the difference of temperatures between a body and a reference element at a known temperature. Not only does such apparatus allow the equalization of the temperature of the body to that of the reference element, but it also permits the recording and/or the regulation of the temperature of the body in a wide variety of applications and throughout the very extended temperature range.

Although only a limited number of embodiments of the invention have been illustrated in the accompanying drawings and described in the foregoing specification, it is to be expressly understood that various changes, such as in the relative dimensions of the parts, materials, use, and the like, as well as the suggested manner of use of the apparatus and method of the invention, may be made therein without departing from the spirit and scope of the invention as will now be apparent to those skilled in the art.

What is claimed is:

1. In a temperature measuring apparatus, a first lens along an optical axis and focussing in a first plane, a first image of an area of a heated body whose temperature is to be measured, a filament having a short calibrated portion positioned in said first plane and adapted to be heated to a known temperature, a second lens positioned in and along said axis and spaced from said first lens, to project along said axis and to focus in a second plane normal to said axis, a composite image having two contiguous portions, namely, said first image and the calibrated portion only of said filament, superposed thereover, a photoelectric cell having a light-sensitive surface positioned in said second plane and mounted for movement in said second plane transversely to said axis at an angle to said calibrated portion of said filament, first means connected with said photoelectric cell to alternately and cyclically move the same as aforesaid, between a first position wherein said cell is energized only by said first portion of said composite image, and a second position wherein said cell is energized by said image of said calibrated portion only of said filament, and second means in circuit with said cell for measuring the output thereof as a function of the difference in temperature between the heated body and said calibrated portion of said filament.

2. The apparatus of claim 1, said second means including an amplifier having its input connected in circuit with said cell, a galvanometer, and circuit connections between the output of said amplifier and said galvanometer.

3. The apparatus of claim 1, said second means including a first amplifier having its input connected in circuit with said cell, a discriminator including first and second transformers, circuit connections between the output of said first amplifier and the primary of said first transformer, means energizing the primary of said second transformer with A.C. of the same frequency as the frequency of movement of said cell, output terminals, and circuit connections from the secondaries of said first and second transformers to said output terminals, to create a voltage difference therebetween only in response to an A.C. output from the secondary of said first transformer.

4. The apparatus of claim 3, said means energizing the primary of said second transformer comprising, a second amplifier, circuit connections between the output of said second amplifier and the primary of said second transformer, and means powered by said first means to produce and supply to the input of said second amplifier, A.C. of the same frequency as that applied by said cell to the input of said first amplifier.

5. The apparatus of claim 1, said calibrated portion of said filament being straight, said cell being oscillated in a direction in said second plane at an angle to the image of said straight calibrated portion of said filament projected onto its light-sensitive surface, and a mask fixed with said cell and having a straight edge in said second plane normal to said direction, in continuously intersecting relation with the image of the calibrated portion of said filament projected onto said second plane.

6. The apparatus of claim 1, the light-sensitive surface of said photoelectric cell having an area of the order of 1 square millimeter.

7. The method of determining the temperature of a heated body, comprising, projecting along an optical axis into a first plane normal to said axis, a first image of an area of said heated body, positioning an element heated to a known temperature in said first plane, on said axis, positioning a light-sensitive means for movement in a second plane normal to and across said axis and spaced from said first plane therealong, projecting a composite image of said first image of said heated body and an image of said heated element, into said second plane, moving said light-sensitive means in said second plane to alternately and cyclically receive said first image only and said element image only, and measuring the output of said light sensitive means as a function of the temperature difference between said heated body and said heated element.

8. The method of determining the temperature of a heated body, comprising, projecting along an optical axis into a first plane normal to said axis, a first image of an area of said heated body, positioning in said first plane on said axis, an element heated to a known temperature, positioning a light-sensitive means for movement in a second plane normal to and across said axis and spaced from said first plane along said axis, projecting a composite image of said first image of said heated body and an image of said element, into said second plane, vibrating said light-sensitive means in said second plane to alternately and cyclically receive said first image only and said element image only, establishing a first alternating voltage in phase with and having an amplitude proportional to the vibration of the light-sensitive means, amplifying the output of said light-sensitive means to establish a second alternating voltage, and combining said voltages to produce a voltage output having a sense depending upon the phase relation between said first and second voltages and a value proportional to the difference between said first and second voltages.

References Cited by the Examiner

UNITED STATES PATENTS

| | | | |
|---|---|---|---|
| 1,970,103 | 8/34 | Runaldue | 88—22.5 |
| 2,241,557 | 5/41 | Nichols | 88—22.5 X |
| 2,494,607 | 1/50 | Bouchet | 88—22.5 X |
| 2,650,307 | 8/53 | Koppius | 88—22.5 |
| 2,886,970 | 5/59 | Munker. | |
| 2,899,858 | 8/59 | Stott | 88—14 |
| 3,068,746 | 12/62 | Vawter. | |
| 3,079,507 | 2/63 | George. | |

JEWELL H. PEDERSEN, *Primary Examiner.*

WILLIAM MISIEK, EMIL G. ANDERSON, *Examiners.*